United States Patent
Howard et al.

(10) Patent No.: US 9,945,653 B2
(45) Date of Patent: Apr. 17, 2018

(54) INDUCTIVE POSITION SENSOR

(76) Inventors: Mark Anthony Howard, Worlington (GB); Darran Kreit, Foxton (GB)

(*) Notice: Subject to any disclaimer, the term of this patent is extended or adjusted under 35 U.S.C. 154(b) by 0 days.

(21) Appl. No.: 13/238,707

(22) Filed: Sep. 21, 2011

(65) Prior Publication Data

US 2012/0007591 A1 Jan. 12, 2012

Related U.S. Application Data

(62) Division of application No. 11/722,289, filed as application No. PCT/GB2005/004946 on Dec. 20, 2005, now abandoned.

(30) Foreign Application Priority Data

Dec. 20, 2004 (GB) .................................. 0427761.2
Apr. 27, 2005 (GB) .................................. 0508535.2

(51) Int. Cl.
*G01B 7/14* (2006.01)
*G01B 7/30* (2006.01)
*G01B 7/00* (2006.01)

(52) U.S. Cl.
CPC ............... *G01B 7/003* (2013.01); *G01B 7/14* (2013.01); *G01B 7/30* (2013.01)

(58) Field of Classification Search
CPC . G01B 7/003; G01B 7/02; G01B 7/04; G01B 7/042; G01B 7/046; G01B 7/044; G01B 7/08; G01B 7/10; G01B 7/14; G01B 7/15; G01B 7/30; G01D 5/204; G01D 5/2066; G01D 5/2073
See application file for complete search history.

(56) References Cited

U.S. PATENT DOCUMENTS

| | | |
|---|---|---|
| 4,737,698 A | 4/1988 | McMullin et al. |
| 4,816,759 A | 3/1989 | Ames et al. |
| 5,062,306 A | 11/1991 | Gotoh et al. |
| 5,796,250 A | 8/1998 | Dames |
| 5,815,091 A | 9/1998 | Dames et al. |
| 6,124,708 A | 9/2000 | Dames |
| 6,246,230 B1 | 6/2001 | Mednikov |
| 6,253,460 B1 | 7/2001 | Schmitz |

(Continued)

FOREIGN PATENT DOCUMENTS

| | | |
|---|---|---|
| DE | 3910597 | 10/1990 |
| EP | 0080055 | 6/1983 |

(Continued)

OTHER PUBLICATIONS

Definition of the term "loop," obtained from the American Heritage Dictionary website (https://www.ahdictionary.com/word/search.html?q=loop), obtained on Jan. 25, 2016.*

*Primary Examiner* — David M. Schindler
(74) *Attorney, Agent, or Firm* — Renner, Otto, Boisselle & Sklar, LLP

(57) ABSTRACT

A detector to measure the displacement of relatively moveable bodies along an axis comprising: a resonant electrical intermediate device further comprising an inductor, whose width varies along the displacement axis, and a capacitor in electrical series which co-operates with an antenna comprising transmit and receive windings whose mutual inductance varies according to the position of the electrical intermediate device relative to the antenna.

14 Claims, 16 Drawing Sheets

(56) References Cited

U.S. PATENT DOCUMENTS

| | | |
|---|---|---|
| 7,208,945 B2 | 4/2007 | Jones et al. |
| 7,286,868 B2 | 10/2007 | Govari |
| 2001/0003438 A1* | 6/2001 | Imaichi et al. ............ 340/572.8 |
| 2001/0020846 A1* | 9/2001 | Miyata ..................... 324/207.17 |
| 2005/0035836 A1 | 2/2005 | Howard et al. |

FOREIGN PATENT DOCUMENTS

| | | |
|---|---|---|
| GB | 1414517 | 11/1972 |
| WO | 2004/036147 | 4/2004 |
| WO | 2004/098943 | 11/2004 |

* cited by examiner 1,14　　　　12　　13　　　　15

INDUCTIVE POSITION SENSOR

RELATED APPLICATIONS

This application is a divisional of U.S. patent application Ser. No. 11/722,289 filed Jun. 20, 2007 now abandoned, which is a national phase of International Application No. PCT/GB2005/004946 filed Dec. 20, 2005 and published in the English language, all of which are hereby incorporated herein by reference in their entireties.

FIELD OF THE INVENTION

This invention relates to an inductive displacement detector, operable to measure the displacement of relatively moveable bodies and which has particular, but not exclusive, relevance to motor encoders.

REVIEW OF THE ART KNOWN TO THE APPLICANT

Various forms of detector have been used to measure the position of two relatively moveable bodies. They are variously referred to as detectors, sensors, transducers, encoders, measurement devices or systems.

A common form of encoder is the optical encoder. This type of encoder typically uses an optical grating which moves relative to an optical transmitter and receiver. Such devices are widely available from companies such as Baumer Electric Ltd., Shrivenham Hundred Business Park, Watchfield, Wiltshire, England. As with most optical systems, any ingress of foreign matter such as dirt or grease can cause obscuration of the optical sensor. This can cause failure with little or no warning. Further, such optical systems require very fine optical gratings for high resolution measurement. These fine gratings exacerbate the susceptibility to foreign matter, as well as being difficult and expensive to manufacture.

A more robust alternative to the optical form of encoder is the magnetic encoder. These are also available from companies such as Baumer Electric Ltd., but typically do not provide high measurement resolution compared to optical systems. Magnetic encoders require precision housings and mechanical assembly to avoid errors caused by magnet or sensor misalignment. Further problems include susceptibility to stray electromagnetic fields and batch to batch variability of the magnets caused by differences in material composition.

Patent GB 1 414 517 discloses an inductive transducer in which a rotor co-operates with a stator. The rotor carries a castellated winding arrangement and the stator carries a spiral transmit winding and an arrangement of two castellated receive windings Application of a high frequency input to the transmit winding results in a modulated output from the receive windings which may be demodulated to provide a signal indicative of the rotor's position relative to the receive windings. The winding arrangements are embodied on single layer printed circuit board and there is no opportunity for the use of electromagnetic balancing. Consequently, the received signals are small and the signal:noise ratio low. Without comprehensive shielding the device would be highly susceptible to electromagnetic disturbances. In order to get the device to work, the location and arrangement of the rotor relative to the stator would need to be very precise and, in particular, the arrangement requires a small distance between the faces of the rotor and stator.

Patent U.S. Pat. No. 4,737,698 discloses an inductive encoder in which a conductive target, such as a copper disk, moves relative to a planar arrangement of transmit and receive windings. Application of a high frequency input to the transmit winding results in a modulated output from the receive windings which may be demodulated to provide a signal indicative of the target's position relative to the receive windings. In order to produce sufficiently high signal to noise ratios, a relatively high input voltage signal is required and the target's stand off distance must be kept to a minimum. High input energy produces high electromagnetic emissions and the minimal stand-off distance limits the scope of application. Further, the position of only one target may be detected per set of transmit and receive windings.

Patent U.S. Pat. No. 5,796,250 discloses a rotary displacement encoder in which various rotors each contain an electrically resonant, passive circuit. The rotors are housed in a 3-dimensional arrangement of transmit and receive windings. The invention in U.S. Pat. No. 5,796,250 solves some of the problems normally associated with traditional encoders or inductive encoders with conductive targets but the winding arrangement is only suitable for rotary or odometer types of construction.

The authors have previously disclosed a number of inventions relating to the measurement of electrical intermediate devices which move relative to planar arrangements of transmit and receive windings. For example, GB02/01204, discloses a method in which high frequency carrier signals are modulated with lower frequency signals in order to provide a digital signal generation and processing technique suitable for position measurement. The invention has limited application in position encoding because of its relatively low speed signal generation and processing algorithm. It is not generally suitable for applications such as motor encoders which require accurate and rapid position measurement at speeds of >10000 rpm.

Multi-layer printed circuit boards (PCBs) are a useful construction technique for antenna and electrical intermediate devices in encoders like those described in GB02/01204 and U.S. Pat. No. 4,737,698. However, a relatively large number of inter layer plated through holes or vias (typically >25) are required to form the cross overs in the conductive tracks of the antennae when produced using PCB techniques. These via holes distort the antenna's electromagnetic field and the high number required for multi-pitch designs, especially in small encoders, is problematic in designing high resolution measurement systems with good linearity (typically <1%). The vias tend to limit the smaller sizes at which such constructions may be deployed. These problems are particularly acute given the increasing use of small DC brushless motors in products such as cameras, consumer electronics and computer controlled devices where the permissible space envelope for a motor encoder can be <30 mm diameter and often <20 mm.

The present invention encompasses the concept of a low cost, high speed, accurate and robust device to detect the relative positions of two or more bodies which is applicable to a variety of topologies but has particular utility in motor encoders.

In a preferred embodiment, the device comprises an arrangement of transmit and receive windings attached to a first body wherein at least one of the transmit and receive windings is formed from a serpentine conductor extending along the measurement axis substantially on one plane and returning substantially on a different plane so as to form loops such that voltages induced in adjacent loops oppose each other and at least one electrical intermediate device attached to a second body operable to move along an axis relative to the first body and wherein the electrical intermediate device comprises a capacitor and inductor in electrical series and wherein the width of the inductor varies such that the level of mutual inductance between the transmit and receive windings varies according to the position of the two bodies.

SUMMARY OF THE INVENTION

In its broadest aspect, the invention provides a device for measuring the position of a first body relative to a second body comprising: a first body which further comprises an antenna arrangement of transmit and receive windings and a second body which comprises an electrically resonant intermediate device whose inductor width, measured at right angles to the measurement axis, varies such that the level of mutual inductance between the transmit and receive windings varies according to the position of the two bodies.

Viewed from a further aspect, the invention provides an inductive position detector as defined in claim 1.

Preferably at least one of the receive windings is arranged as a series of loops such that voltages induced in adjacent loops oppose each other.

Preferably at least one of the receive windings is formed from a serpentine conductor which extends along the measurement axis substantially on one plane and returns substantially on a different plane so as to form a series of loops.

Preferably the receive windings are arranged side by side along the measurement path and do not overlap.

Preferably the receive and transmit windings are arranged on a single printed circuit board so as to form an antenna.

Preferably the receive windings are displaced relative to each other along the measurement path by a quarter winding pitch so as to form a sine and cosine winding.

Preferably the electrical intermediate device comprises a capacitor and inductor in electrical series so as to form a resonant or tank circuit.

Preferably the electrical intermediate device's inductor is formed by a conductive track on a printed circuit board and whose width varies periodically along the measurement axis.

Preferably the electrical intermediate device's inductor is formed by a serpentine conductor extending along the measurement axis on a plane and returning on the same plane.

Preferably the windings in the electrical intermediate device's inductor and the receive windings are in a multi-pitch periodic arrangement so as to provide high resolution but ambiguous measurement over the measurement range.

Preferably a multi-pitch periodic electrical intermediate device and antenna co-operate with a single pitch electrical intermediate device and antenna to provide high resolution, absolute position measurement over the measurement range.

Preferably the detector is controlled by an electronics circuit which has a first 2-bit digital quadrature electrical output indicative of coarse but high speed position and a second multi-bit digital data output indicative of high resolution but low speed position.

Preferably the electronics circuit comprises a microcontroller with memory which may store data such as calibration values.

Preferably the detector is calibrated, prior to use, with a measuring instrument of higher measurement accuracy and the resulting calibration values stored in the detector's electronic memory.

Preferably the detector is controlled by an electronics circuit which is constructed so that it may control several sets of detectors each of which has its own distinct resonant frequency.

Preferably the detector is controlled by an electronics circuit which is constructed so that it may control several sets of detectors each of which has its own period of time in which to transmit and receive signals.

Preferably the antenna comprises electrically balanced transmit and receive windings.

Preferably the antenna comprises sets of receive windings of different pitches so as to form a Vernier pattern.

Preferably the electrical connections to the antennae or electronics are transmitted via a set of transformer windings.

Preferably the electrical intermediate device's electrical circuit contains a switch in series with the capacitor and inductor so as to provide contactless transmission of switch status.

Preferably the electrical intermediate device contains a multiplicity of resonant circuits whose frequency or position or both may be detected so as to provide a method of identification.

Preferably an electrical intermediate device whose position is fixed or known is used together with at least one electrical intermediate device whose position is to be measured so that the reliable operation of the detector may be checked.

Preferably the electrical intermediate device's inductor has a magnetically permeable core which is operable to displace relative to part of the inductor's windings so that the change in the core's position alters the inductance value which, in turn, alters the electrical intermediate device's resonant frequency and hence permits contactless detection.

Preferably the detector is used to measure the relative twist between two parts of a stationary or rotating shaft as a means of measuring the torque applied to the shaft.

Preferably the detector's antenna in a rotary embodiment comprises at least one winding which occupies a segment of substantially less than 360 degrees.

Preferably the detector compensates for temperature variation by measuring temperature and altering the measured position values.

Preferably the detector measures temperature by measuring the resistance of at least one of the antenna's windings.

BRIEF DESCRIPTION OF THE DRAWINGS

In the accompanying drawings.

DESCRIPTION OF THE PREFERRED EMBODIMENT

Figure 1:
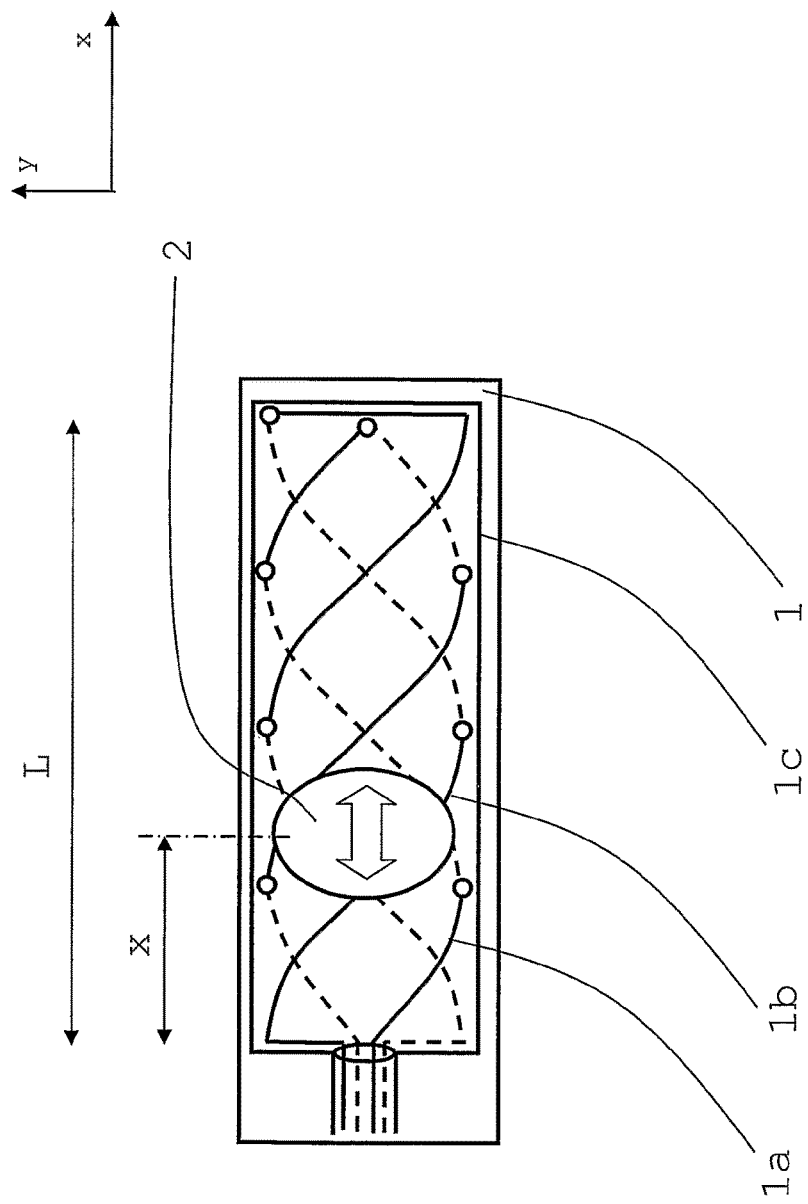
FIG. 1 shows a schematic form of a known inductive detector.

FIG. 1 shows a simplified, schematic, plan view of a known form of position encoder. An antenna [1] contains a sinusoidal receive winding [1a] and a cosinusoidal receive winding [1b], surrounded by a transmit winding [1c] co-operating with an electrical intermediate device [2]. The two receive windings [1a & 1b] are displaced by ¼ of the winding pitch along the measurement (x) axis. The two receive windings [1a & 1b] are arranged in series of loops along the measurement axis such that voltages induced in adjacent loops oppose each other. The loops in the receive windings [1a & 1b] are formed using via or plated through holes positioned on either side of the measurement axis. It should be noted that in this much simplified example only 8 vias are shown for reasons of clarity. However, in practice, each of the receive windings [1a & 1b] is likely to use multiple turns in each loop and consequently many more than 8 vias will be required. >100 vias may be required if a multi-pitch arrangements is used in which each loop has multiple turns. All the windings are arranged along an axis [x] on a planar, insulating substrate over a full scale [L]. The antenna [1] co-operates with an electrical intermediate device [2]—such as a copper disk. The transmit winding [1c] generates an alternating electromagnetic field when energised with an AC voltage. When the electrical intermediate device [2] enters the field, currents are induced to flow in it which, in turn, produce their own electromagnetic field. The ratio of the voltages induced in the receive windings [1a & 1b] is indicative of the electrical intermediate device's position relative to the antenna. This type of encoder works well but is generally only suitable to applications in which measurement frequencies of <500 Hz are acceptable. This is due to the need to sample receive winding voltages, ratio mathematically and then digitise rotor position. Furthermore, the large number of PCB via holes further limits such inventions to relatively large constructions with relatively few pitches. It would be impossible, for example, to arrange such a construction (with commercially attractive measurement characteristics) in a 20-pitch rotary embodiment on a 15 mm diameter rotor and stator using traditional printed circuit board techniques. Far fewer pitches would be possible with traditional constructions but inductive encoders with relatively few pitches have relatively low resolution.

Figure 2:
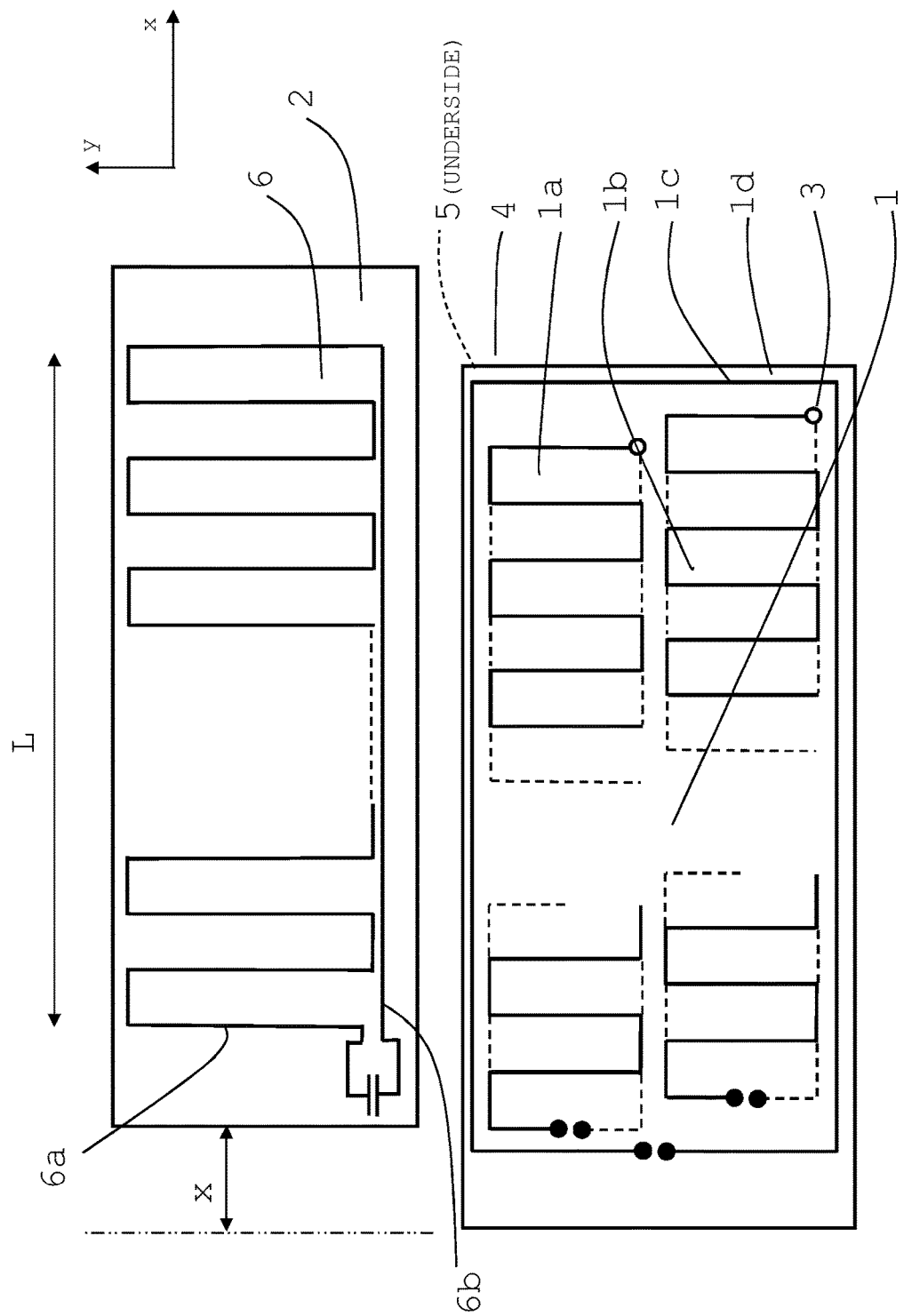
FIG. 2 shows a simplified, schematic linear form of the detector.

FIG. 2 shows a simplified, schematic, plan view of the invention's main elements in which a resonant electrical intermediate device [2] co-operates with an antenna [1]. For reasons of clarity the electrical intermediate device [2] is shown to one side of the antenna [1], displaced in the y-axis. In operation, the electrical intermediate device [2] would be located directly above the antenna [1]. In a preferred embodiment the electrical intermediate device [2] and antenna [1] are used to detect the relative displacement of the bodies to which they are attached. The bodies are arranged so as to move principally in a single linear axis (x) although it is important to note that the invention is not restricted to linear motion. The antenna [1] is electrically connected to an electronic circuit [not shown for clarity]. The electronics circuit [18] is energised by an electrical power supply and outputs electrical data in accordance with the relative position of the electrical intermediate device [2] and antenna [1]. The antenna's [1] transmit winding [1c] is energised with an AC signal by the electronics circuit [18] at substantially the same frequency as the resonant frequency of the electrical intermediate device [2]. When the electrical intermediate device [2] enters the field produced by the energised transmit winding [1c], currents are induced to flow in the electrical intermediate device [2] which, in turn, cause their own electromagnetic field. This field can be sensed by the antenna's receive windings [1a & 1b]. The antenna's receive windings [1a & 1b] are laid out in a multi-pitch fashion and are displaced side by side to each other in the y-axis and shifted relative to each other along the x-axis by ¼ of their winding pitch so as to form a sinusoidal and cosinusoidal winding. In this particular embodiment their footprints have zero overlap (although some degree of limited overlap is permissible in other arrangements to minimise the amount of PCB area required—as described later in FIG. 6). Each of the antenna's receive windings [1a & 1b] is arranged as a series of loops extending along the measurement path and formed by a first or outward serpentine conductor on the top layer and a return serpentine conductor on the bottom layer. Connection of the outward and return serpentine conductors is made at a single via hole [3] at the end of the measurement path. The resonant electrical intermediate device [2] is constructed in a similar but different manner. Preferably the resonant electrical intermediate device's inductor [6] is formed by a conductor extending along the measurement (x) axis in a periodic serpentine pattern on a plane and returning on the same plane back along the measurement axis so as to form a loop whose width varies periodically along the measurement axis. Preferably the period of the electrical intermediate device's inductor [6] is substantially the same as the period of the receive windings [1a & 1b]. Preferably the transmit winding [1c] is arranged in electrical balance with respect to the receive windings [1a & 1b]. As the electrical intermediate device [2] displaces relative to the antenna [1] the voltages induced in the receive windings [1a & 1b] vary sinusoidally. When the voltage is maximised in the sine receive winding [1a] the signal is minimised in the cosine receive winding [1b]. Two voltages in quadrature are received. These can be measured and an arctangent calculation carried out to provide an electrical indication of the relative displacement. Clearly, the position is absolute over each pitch of the windings but ambiguous over the full scale. Electrical outputs from the electronic circuit are proportional to the position or change in position of the electrical intermediate device [2] relative to the antenna [1]. A power supply of 5 VDC with a current of 10 mA is preferable. Preferably the electrical intermediate device [2] is manufactured from a single sided printed circuit board such as CEM1 with 1 ounce copper tracking. Preferably the antenna [1] and corresponding electronics circuit [18] are constructed from a double sided printed circuit board such as 0.8 mm thick FR4 with 1 ounce copper tracking. Preferably the printed circuit boards are protected from humidity and fluids with a sprayed conformal coating such as Plastic Seal 60 from Servisol Ltd. of Bridgwater, Somerset, England.

It will be obvious to those skilled in the art that the linear form described above can be transformed into a rotary version by wrapping the ends of each of the various windings around to complete a circle. In this case it is preferable to adjust the effective width of each receive winding [1a & 1b] to achieve an equal coupling area. Indeed an important commercial application for the invention is in a rotary form for motor encoders but the linear form is described here for reasons of clarity and ease of understanding. Measurement linearity may also be improved by varying the mark space of the serpentine outward and return conductors.

Figure 3:
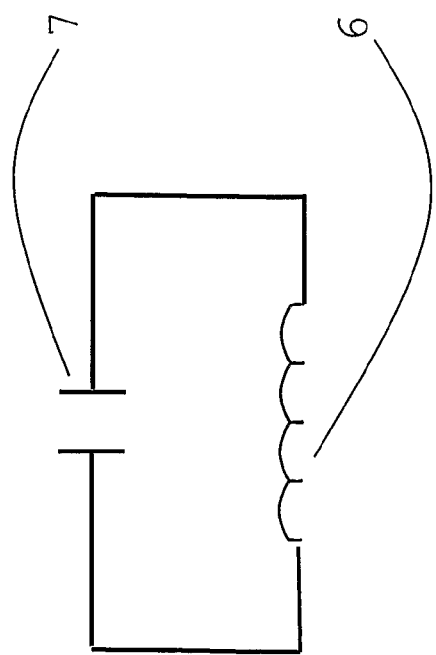
FIG. 3 shows an electrical schematic of the electrical intermediate device's resonant circuit.

FIG. 3 shows an electrical schematic of the target's resonant circuit, which comprises an inductor [6] and capacitor [7] in electrical series. Preferably resonant frequencies in the range 100 kHz-10 MHz are used.

Figure 4:
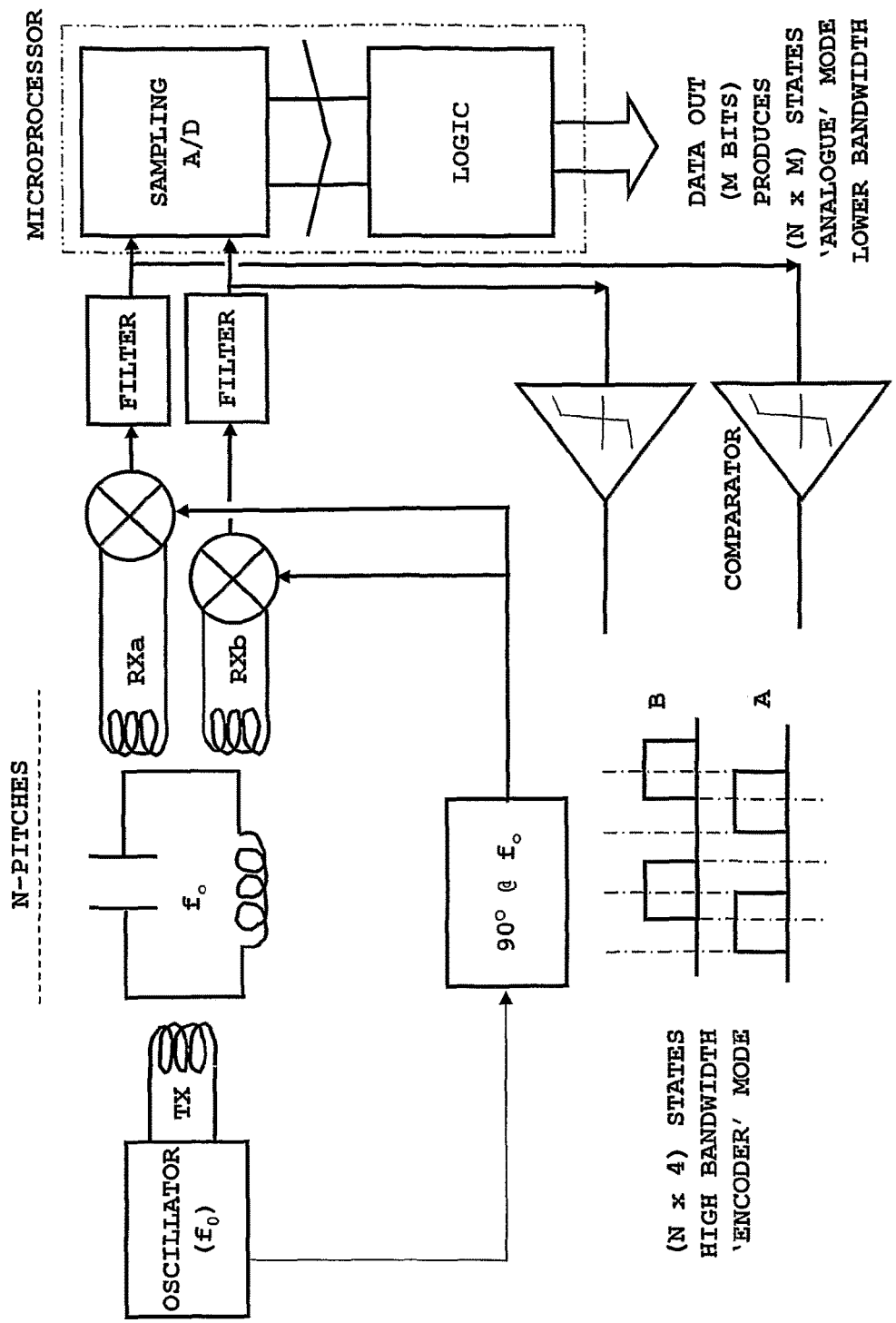
FIG. 4 shows a schematic arrangement of the detector's electronic circuit.

FIG. 4 shows a schematic of the electronic circuit which is largely self explanatory. Since the signal in first receive winding RXa is proportional to sin(x) and the signal in the second receive winding RXb is proportional to cos(x), then position 'x' can be obtained from the equation (L/2pi) *ARCTAN(RXa/RXb). The power supply may pass through an over voltage protection circuit if voltage spikes are possible from the electrical supply. Reverse polarity protection is also a common requirement. Typical power requirements are 5V at 10 milliamps at a 100% duty cycle. This may be reduced generally in line with the reduction in duty cycle through a sleep mode. Preferably, the output signal for high bandwidth 'encoder' mode is in a pulse train. Preferably, the output signal for the lower bandwidth 'analogue' mode is a serial data stream such as SPI. Preferably the circuit [18] is constructed either from an application specific integrated circuit or a circuit of surface mount electronics soldered to the same printed circuit board as the antenna [2] with a short distance between the circuit [18] and the antenna's [2] windings so as to avoid any electromagnetic emissions or susceptibility problems. One aspect of the circuit [18] worthy of note is that the circuit has two modes of operation that can run independently, if required. In the first mode of operation—referred to as 'encoder' mode— two pulse trains are produced—as used already as a defacto standard in many of the existing optical or magnetic proprietary encoders. The pulses are produced by detecting the effective zero crossings of the sine and cosine signals produced by the two receive windings. This mode has the advantage of high bandwidth and is of particular utility for relatively coarse position measurement at high speeds. Such a mode may be used in electrical commutation of motor windings for example or for speed control at high speed. In the second mode of operation—referred to as 'analogue' mode—two sinusoidally varying analogue voltages are produced in quadrature. From these signals, position may be calculated accurately by using an arctan calculation. This mode has the advantage of high-resolution position measurement. It has particular utility in fine position measurement at lower speeds. Such a mode may be used in the alignment of mechanical parts driven by a motor. The two regimes of high speed pulse counting, or rate measurement, combined with low speed fine position measurement are a common requirement of motor control systems. For the 'encoder' mode to operate well (independently of the 'analogue' mode) the maximum number of pitches should be formed along the available measurement path. This can be achieved as described above by using a winding layout which requires very few via holes in the electrical intermediate device and the receive winding layouts.

Modifications and Further Embodiments

Figure 6:
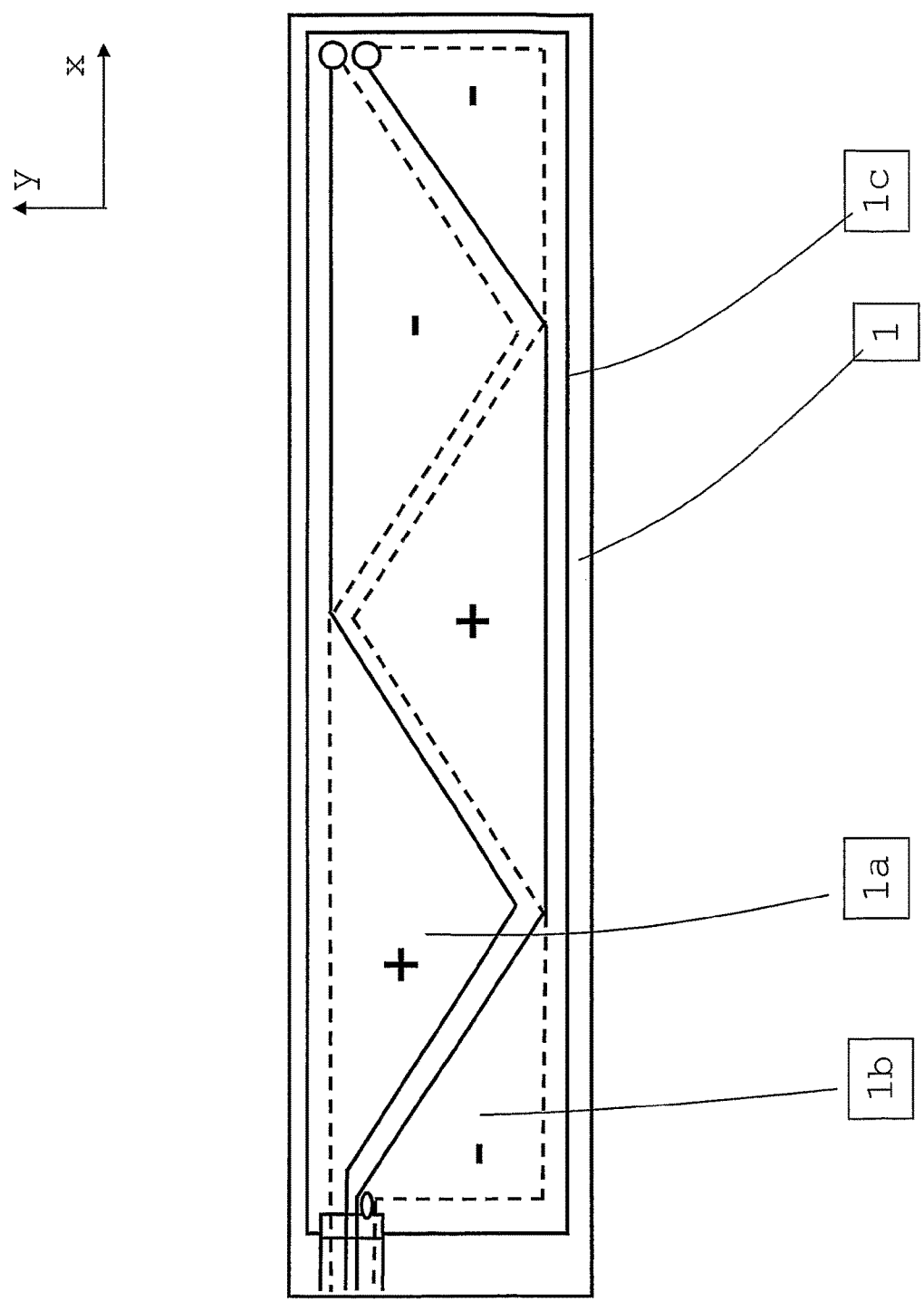
FIG. 6 shows a triangular form of the antenna.

In FIG. 2 an electrical intermediate device [2] is shown with a rectangular form serpentine conductor co-operating with rectangular formed windings [1a & 1b] on the antenna [1]. The invention is not necessarily constrained to such a construction. The windings may be in a sinusoidal, triangular, elliptical or other such form. FIG. 6 shows a triangular form of the winding arrangement in the antenna [1] embodied on a PCB. The antenna [1] comprises a transmit winding [1c] extending along the measurement axis and surrounding two receive windings [1a & 1b] which are offset by ¼ of their winding pitch so as to form a sinusoidal and cosinusoidal winding. Each of the receive windings [1a & 1b] is formed by a serpentine conductor extending along the measurement axis on the top layer of a PCB; connecting to the bottom layer via a plated through hole towards the end of the antenna [1] and returning back in a serpentine fashion so as to form loops in each of the windings such that voltages induced in each of the adjacent loops oppose each other FIG. 2 shows a multiple pitch arrangement. Such arrangements of typically >6 pitches are preferable for many of the invention's commercial applications—notably motor encoders. The invention is not necessarily constrained to multiple pitches and may comprise just a single pitch electrical intermediate device and antenna.

So far, an arrangement with a single transmit and two receive windings has been described. The invention is not necessarily so constrained and can operate with transmit windings taking the place of the receive windings described thus far and a single receive winding taking the place of the transmit winding described thus far. Essentially the invention described thus far can be run in reverse with time-phase shifted signals fed in to the spatially phase shifted windings thanks to the principle of mutuality.

In FIG. 2 an electrical intermediate device [2] with an inductor [6] is shown with a serpentine conductor [6A] extending along the x-axis (i.e. the outbound) with a return conductor [6B] back to the capacitor in a straight line. The invention is not necessarily constrained to such a construction and the return conductor may be returned on the other side of the PCB in a similar fashion to the outbound conductor. The main aspect of the inductor [6] is that its width should vary periodically along the measurement (x) axis.

The length of the electrical intermediate device [2] does not have to be as long as the antenna [1] as described thus far. Whilst this is preferable for small diameter rotary encoders it is not preferable for relatively long linear displacements where either a long electrical intermediate device [2] should be paired with a shorter antenna [1] or vice verca.

Other spatial harmonic width variation components may be added to the fundamental varying part of the windings to improve linearity.

Measurement resolution over a distance L can be improved by the use of multiple pitch windings as shown in FIG. 2 compared to a single pitch arrangement. If, for example, an electronics circuit [18] produces measurement resolution of 10 bits over a full scale of L in a single pitch arrangement, this can be improved by arranging the electrical intermediate device's and antenna windings in to multiple pitches of <L. For example, if the windings are arranged in 8 pitches each of length L/8 then the measurement resolution will be equivalent to 10 bits over L/8, in other words a 8-fold improvement in measurement resolution.

One draw back of multi-pitch arrangements is that the measured position is ambiguous rather than absolute over the full measurement distance. Absolute position measurement can be achieved by the use of a second, coarse pitch arrangement extending over the full scale. Preferably an electrical intermediate device of a second frequency cooperates with an arrangement of transmit and receive windings as described in the author's patent application GB0427410.6. In this way a high resolution, ambiguous measurement can be produced in addition to a low resolution, absolute measurement. The two measurements may be combined electronically or in software to produce a high resolution, absolute position measurement. The same frequency can be used for both electrical intermediate devices if there is sufficient spatial separation between them.

Figure 5:
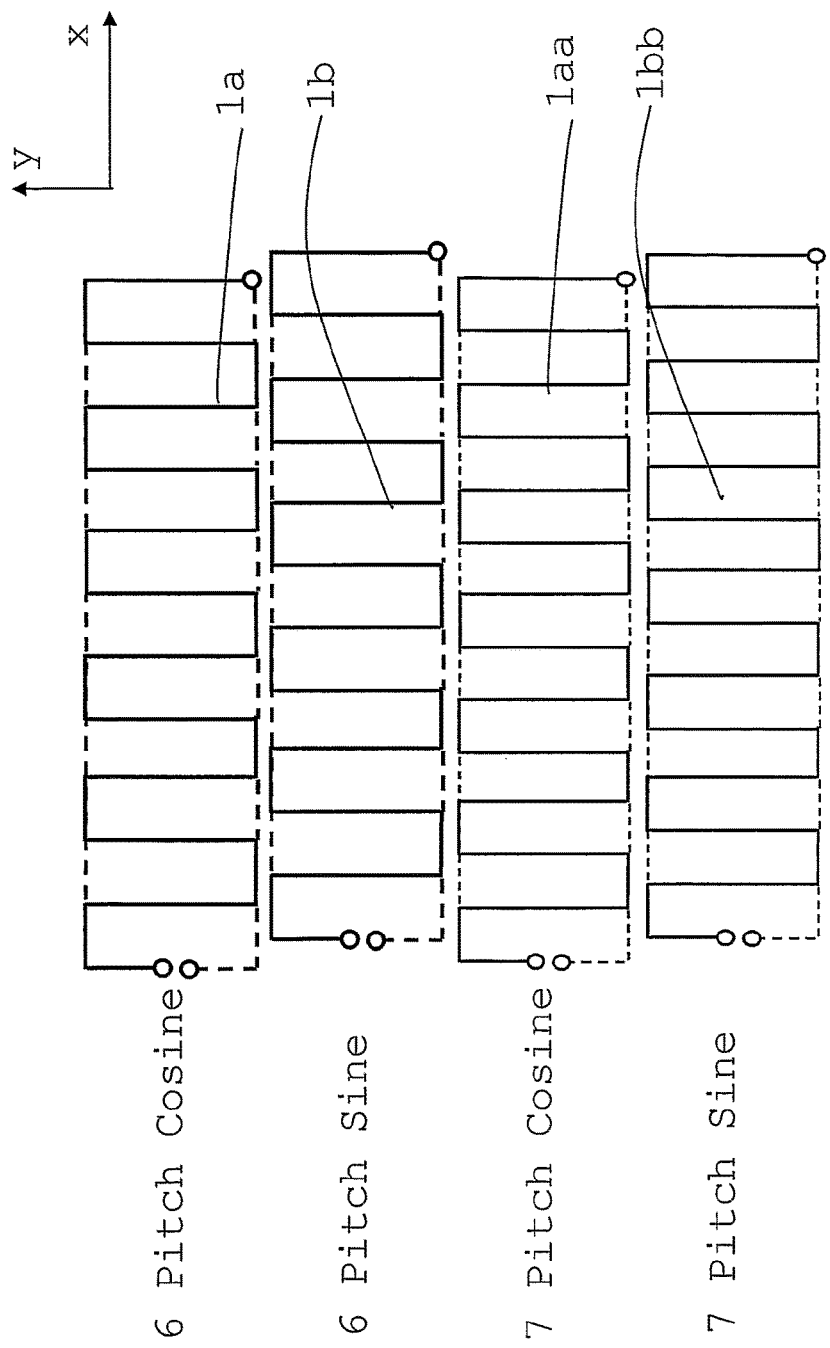
FIG. 5 shows a Vernier arrangement of windings for the electrical intermediate device's inductor.

A first alternative scheme to coarse and fine pitch winding arrangements is the use of a Vernier technique. A schematic of such an arrangement is shown in FIG. 5. This technique uses two or more multi-pitch windings in the antenna. For example, a first and second receive winding [1a & 1b] of pitch L/6 is used with a third and fourth receive winding of pitch L/7 [1aa & 1bb]. There are various ways to construct the corresponding electrical intermediate device [2]. A first method is to use a single inductor [6] pitch winding of L/6.5. A second method is to use two tank circuits—the first with an inductor of pitch L/6 cooperating with the L/6 receive windings and a second inductor [6]—at a different frequency—of pitch L/7 cooperating with the L/7 receive windings. A third method is to use an electrical intermediate device inductor [6] of pitch L/6 which extends to cover both sets of L/6 & L/7 receive windings but which is <6 pitches long. Whatever construction of electrical intermediate device [2] is used, the ambiguous readings can be combined so as to provide a unique or absolute indication of position over the measurement range. The unique indication will be preserved up to the lowest common multiple of the winding pitches. In this example the lowest common multiple is L.

A second alternative to enable high resolution measurement over extended scales can be achieved with the use of a reed or Hall switch for example. In such an instance a magnet is attached to the electrical intermediate device which triggers the reed or Hall switch to signify that, for example, a second area of the electrical intermediate device is in operation.

A third alternative to enable high resolution measurement over extended scales can be achieved with the use of a repetitive winding pitch over a long distance (with fundamentally incremental position measurement) but wherein the electronic circuit counts the number of cycles so as to provide an absolute electrical signal. This count can be checked against a single point resonant device at a second frequency placed along the multiplicity of repetitive windings. When the antenna [2] and electronics circuit [18] passes over the shorter pitch resonant device the count may be checked and rectified in software if necessary.

Figure 7:
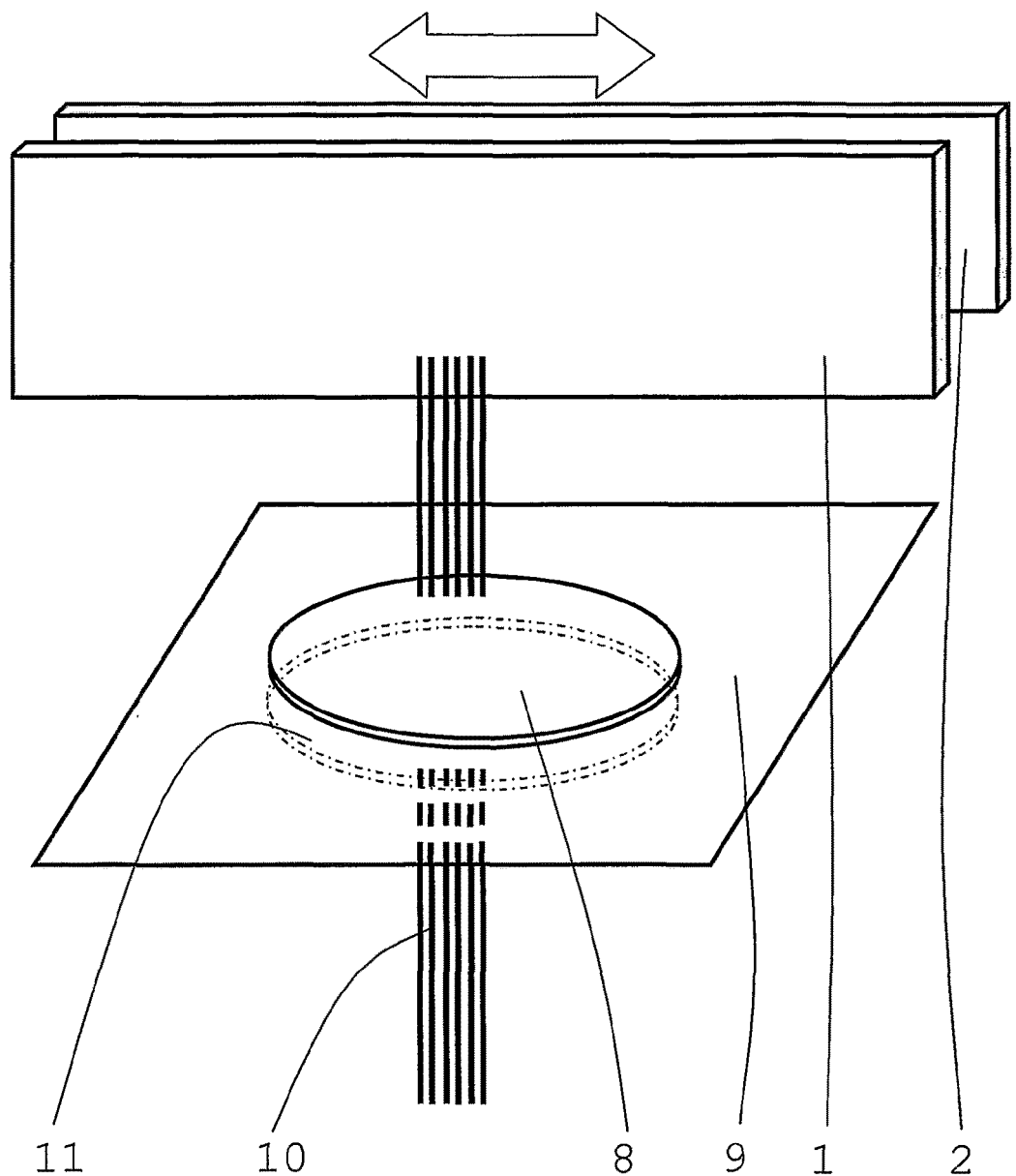
FIG. 7 shows a linear form of the detector with a transformer coupling across a membrane.

FIG. 7 shows a linear form of the encoder in which the electrical connections [10] to the antenna cross a membrane [9] without mechanically perforating the membrane. The arrangement has particular use in pressure vessels or vessels containing liquids where perforations or holes in the vessel are preferably avoided. The electrical cables [10] are each connected to a set of primary windings [11] of a transformer on the first side of the membrane [9]. The electrical signals are carried across the membrane to the transformers secondary windings [8] on the second side of the membrane. Preferably the transformer windings [8 & 9] are embodied as spiral tracks on a printed circuit board.

Figure 8:
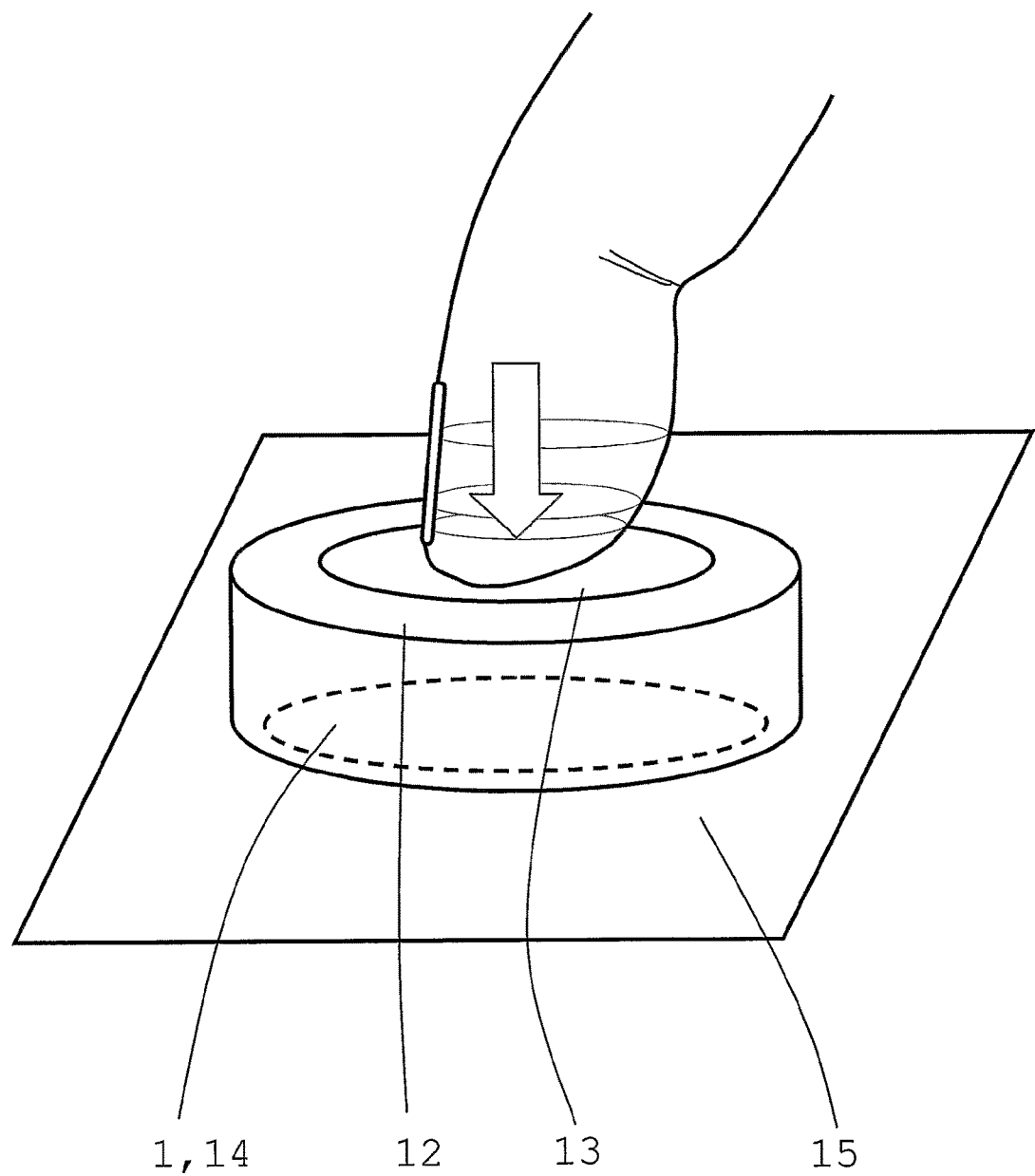
FIG. 8 shows the detector as a rotary user interface element with a push-button switch.

FIG. 8 shows a rotary user element [12] with a push button [13]. Such an arrangement might be used, for example, in a user interface for an information system so that a user might scroll through a menu structure in a graphical user interface and make a selection. The user element [12] is operable to rotate under the action of a user. The user element contains a rotary electrical intermediate device [2] whose position is measured by an antenna (not shown) positioned on the underside of an impermeable fascia panel [15]. The electrical intermediate device [2] also contains a push button [13] and a switch [14] which is normally open but closed under the action of a user depressing the push button [13]. Such an arrangement is advantageously deployed when the transmission of switch status is required to be communicated in a non-contact fashion, for example, through an impermeable membrane providing a hermetic seal. Advantageously the user element [12] may be held against the fascia panel [15] under the action of two or more magnets—the first in the user element [12], the second in or beneath the fascia panel [15]. In such an arrangement the user element [12] may be readily removed so that a smooth impermeable fascia is left to facilitate ease of cleaning or sterilisation and during which no ingress of fluid to the host equipment is possible. Further user interaction with the host equipment is prevented which is useful in preventing accidents caused by improper use by children, vandals or untrained personnel. Additional magnets may be used to provide tactile feedback as the user element [12] is operated.

Figure 9:
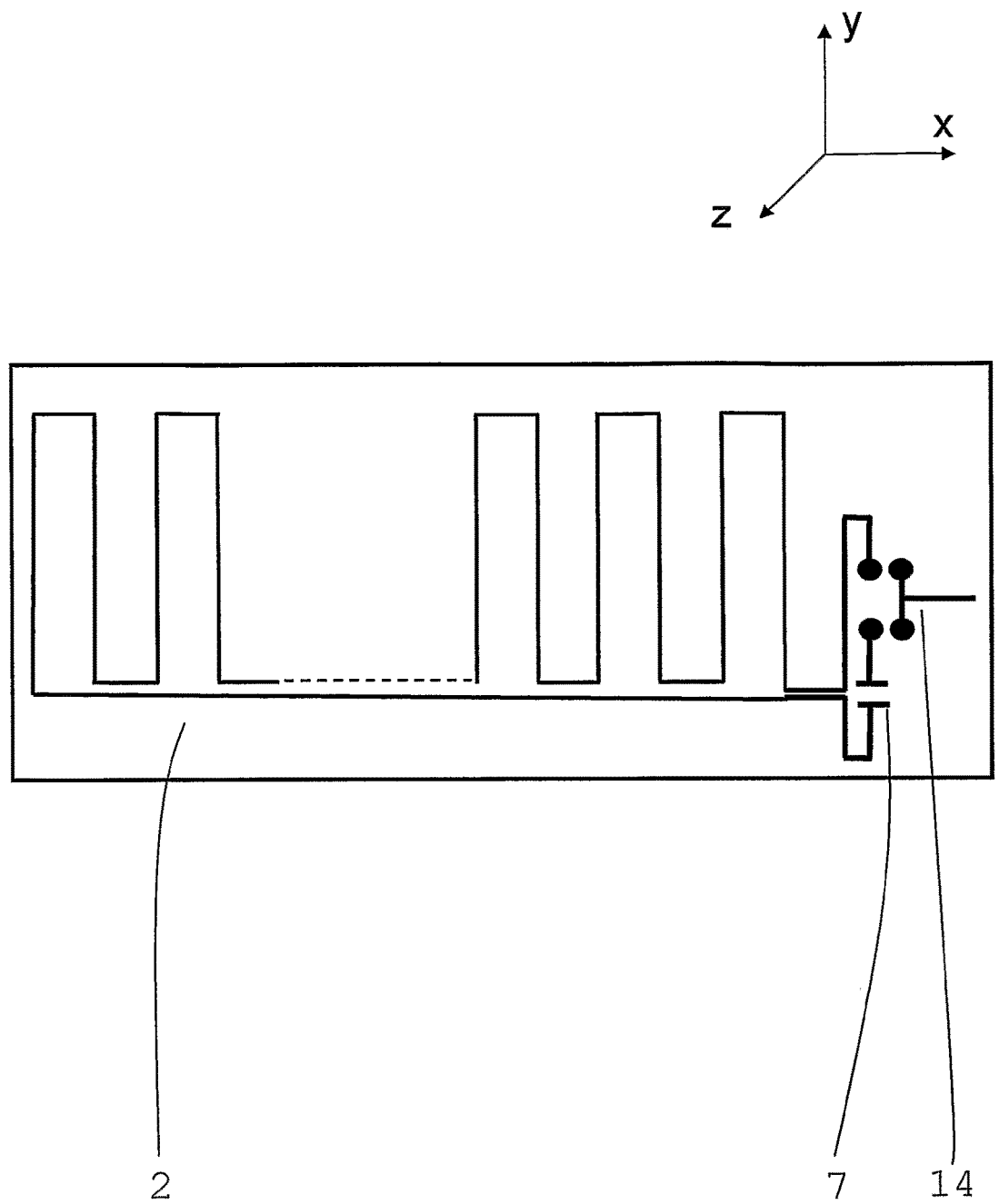
FIG. 9 shows an electrical schematic of the electrical intermediate device shown in FIG. 9.

FIG. 9 shows an electrical schematic of a non-contact method of transmitting switch status as used in the system described in FIG. 8. A normally open switch [14] is arranged in electrical series with the electrical intermediate device's capacitor [7] and inductor [6]. When a local antenna [1—not shown] is energised, currents will be unable to flow in the electrical intermediate device [2] because of the open circuit. No return signal will be received by the antenna [1]. When the switch [14] is closed, currents will flow and the antenna [1] will receive a signal. In this way it is possible for data regarding switch [14] position to be transmitted in a contactless manner. Data regarding multiple switches [14] may be provided by using multiple resonant circuits of different resonant frequencies. Alternatively, the switches [14] can be used to switch in other capacitors [7] or inductors [6] so as to alter the natural frequency of the electrical intermediate device [2] and hence provide data on switch [14] position. Alternatively normally closed switches may be used and the loss of signal when the switch is depressed sensed accordingly.

Figure 10A:
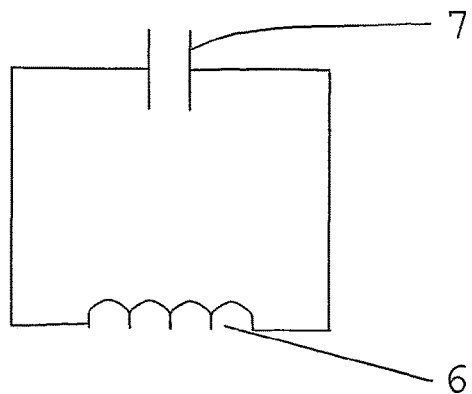
FIGS. 10a, 10b, 10c, 10d, 10e & 10f show various arrangements of electrical intermediate device so that they may be used as a method of identification.
Figure 10B:
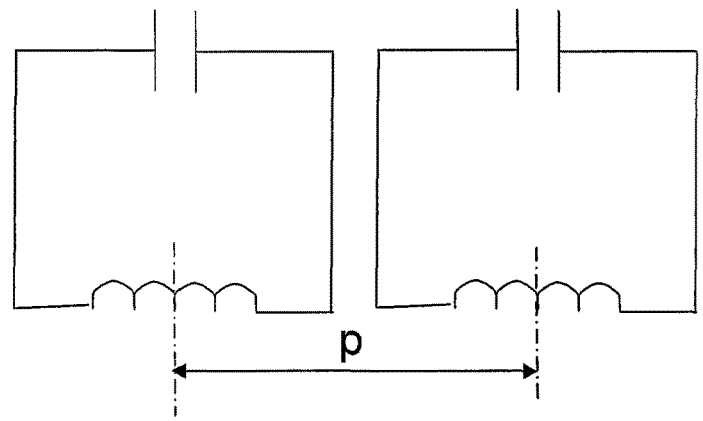
Figure 10C:
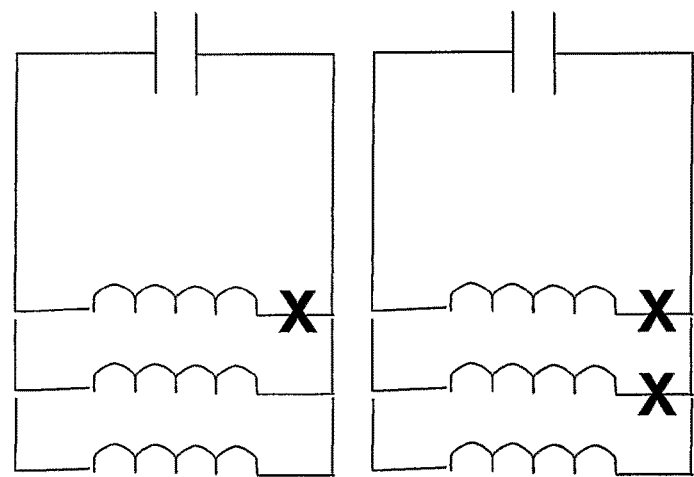

FIGS. 10a, 10b & 10c show schematic methods of encoding identities on to electrical intermediate devices.

In FIG. 10a an inductor [6] and capacitor [7] are arranged in electrical series to form an electrical intermediate device [2]. Varying either the capacitor [7] or inductance [6] will vary the resonant circuit's natural frequency. This can be used as a way of encoding identity against a predetermined set of identities and frequencies held in the electronic circuit's memory. Typically, a practical range of possible frequencies will be limited to about 10, so that inherent frequency variations can be tolerated and frequency harmonics avoided.

In FIG. 10b 2 resonant circuits are provided. In this way the combination of potential resonant frequencies increases the practical number of possible identities. Further by varying the distance between the circuits, p, this non-frequency based variable increases the range still further. Large numbers of identities can be encoded with the use of more than 2 electrical intermediate devices [2] and 2-dimensional (in x & y-axes) sensing of relative displacement.

FIG. 10c shows a schematic of a resonant circuit with inductors in parallel. By obliterating part of the winding of one or more of the inductors [6] at positions marked X then the circuit's inductance is altered and, in turn, the resonant frequency. This can be readily performed using a computer numerically controlled printed circuit board drilling machine and is an alternative method of varying a circuit's frequency compared to changing the value of the capacitor. In this way, resonant circuits can be produced in bulk from a small number of PCB's and capacitors and then tailored to requirements at point of delivery.

Figure 10D:
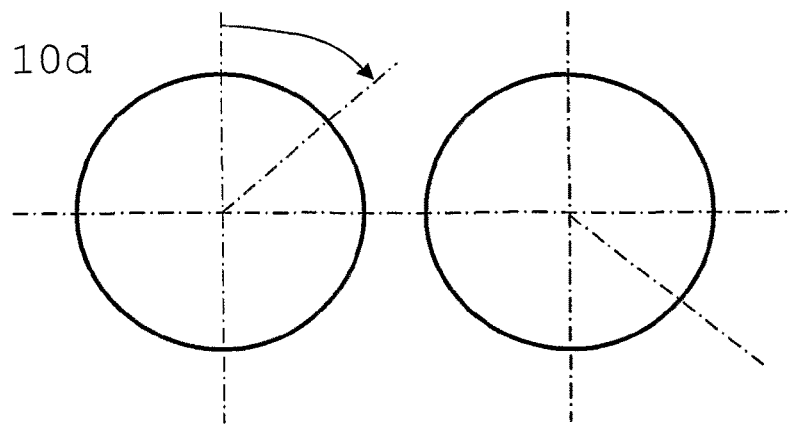
Figure 10E:
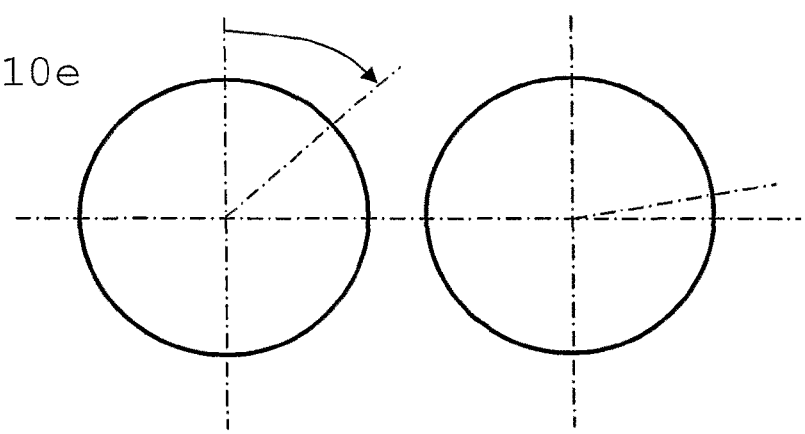
Figure 10F:
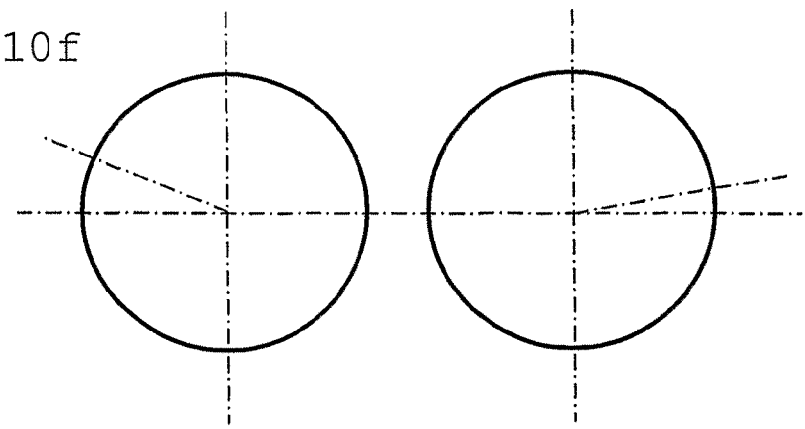

FIG. 10d shows the use of 2 rotary electrical intermediate devices [2] whose centre distance is constant but whose rotary position can be varied. By way of example, we may consider the use of 2 electrical intermediate devices [2] of the same frequency whose rotational position can be measured by 2 electrically separate antennae [1]. If each of the rotary electrical intermediate devices [2] can be set to one of 36 positions then the total number of identities=36× 36=1296.

Figure 11:
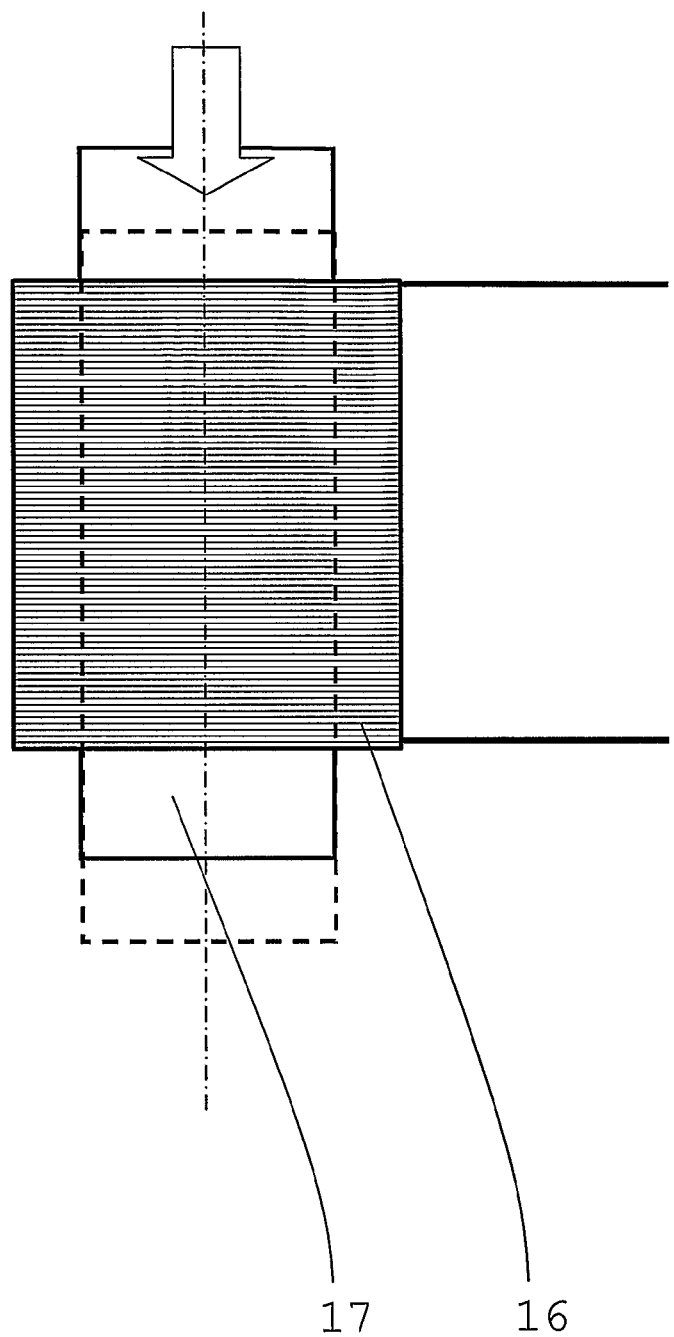
FIG. 11 shows part of an electrical intermediate device's inductor with a magnetically permeable core which is operable to displace relative to the inductor.

FIG. 11 shows an alternative arrangement to provide contactless transmission of data other than making or breaking a switch [14] contact. In some applications it may be undesirable to use an electrical switch [14]. For example in wet or dirty environments the switch [14] may become unreliable due to foreign matter or fluid ingress at the switch's [14] electrical contacts. In such instances data may be provided by changing the inductance value of part of the inductor [6] in the electrical intermediate device [2]. FIG. 11 shows part of the electrical intermediate device's inductor [6] which has been wound in to a coil [16]. A magnetically permeable element [17]—preferably a ferrite core—is arranged so that, if it is pressed, it moves along the main axis of the coil [16] and causes a change in inductance. This will be detected as a shift in the resonant frequency of the electrical intermediate device [2]. Preferably the coil [16] is placed in series with the electrical intermediate device's inductor [6].

Figure 12:
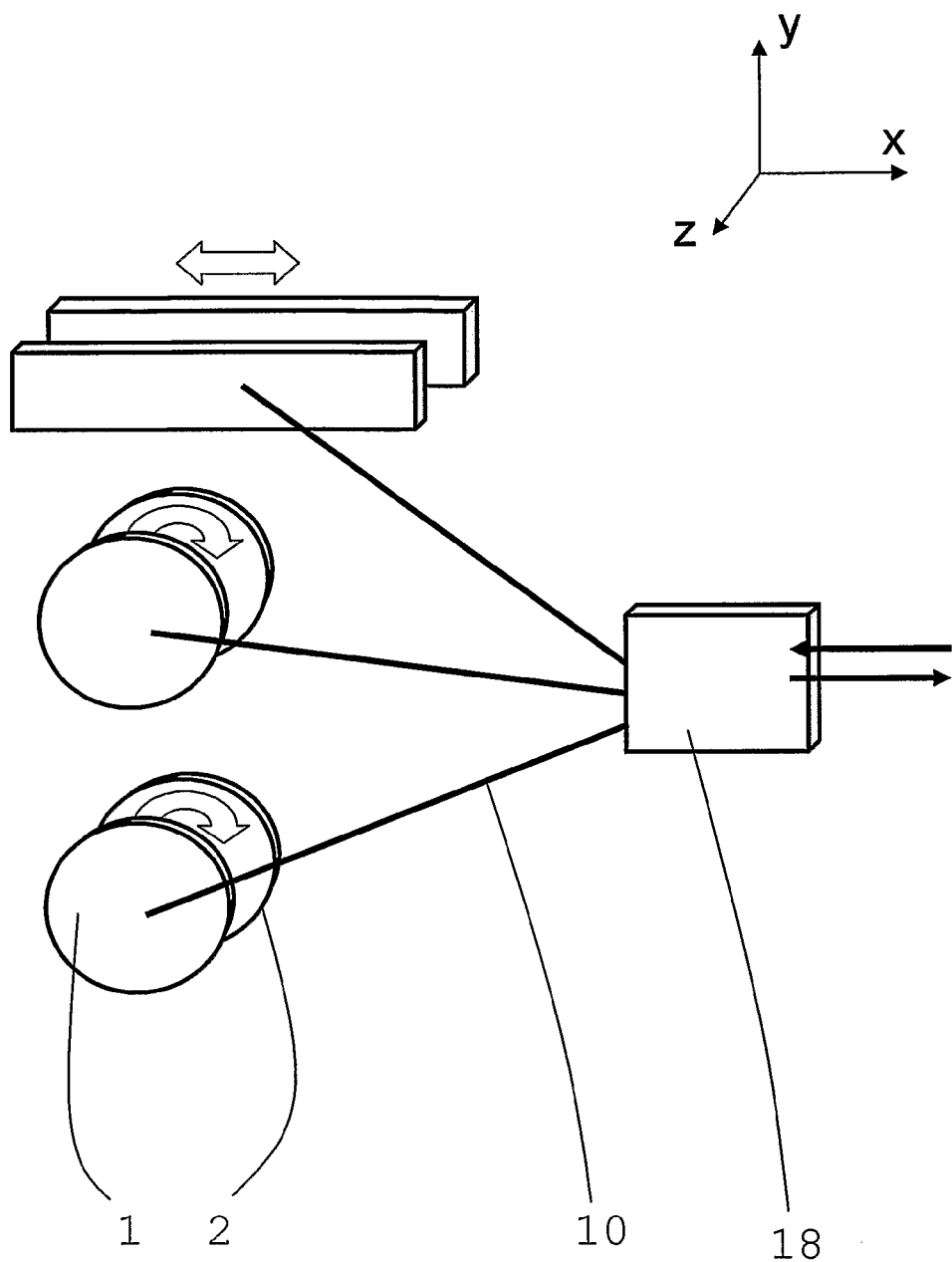
FIG. 12 shows a schematic of a system with multiple sensors controlled by a single electronic circuit.

FIG. 12 shows a schematic of a network of antennae [1] and electrical intermediate devices [2] of various shapes and sizes. Each of the antennae [1] is energised by a single electronics circuit [18] via a multiplicity of interconnecting conductors [10]. Each of the antennae [1] and electrical intermediate device [2] sets have their own resonant frequency, for example 1 MHz, 2 MHz and 3 MHz, and the excitations, signal receptions and resulting position calculations for each detector can be made as the excitation frequency steps through a pre-programmed sequence. Alternatively time division multiplexing of the transmit and receive connections between antenna [1] and electronics circuit [18] at a single frequency can be employed.

Figure 13:
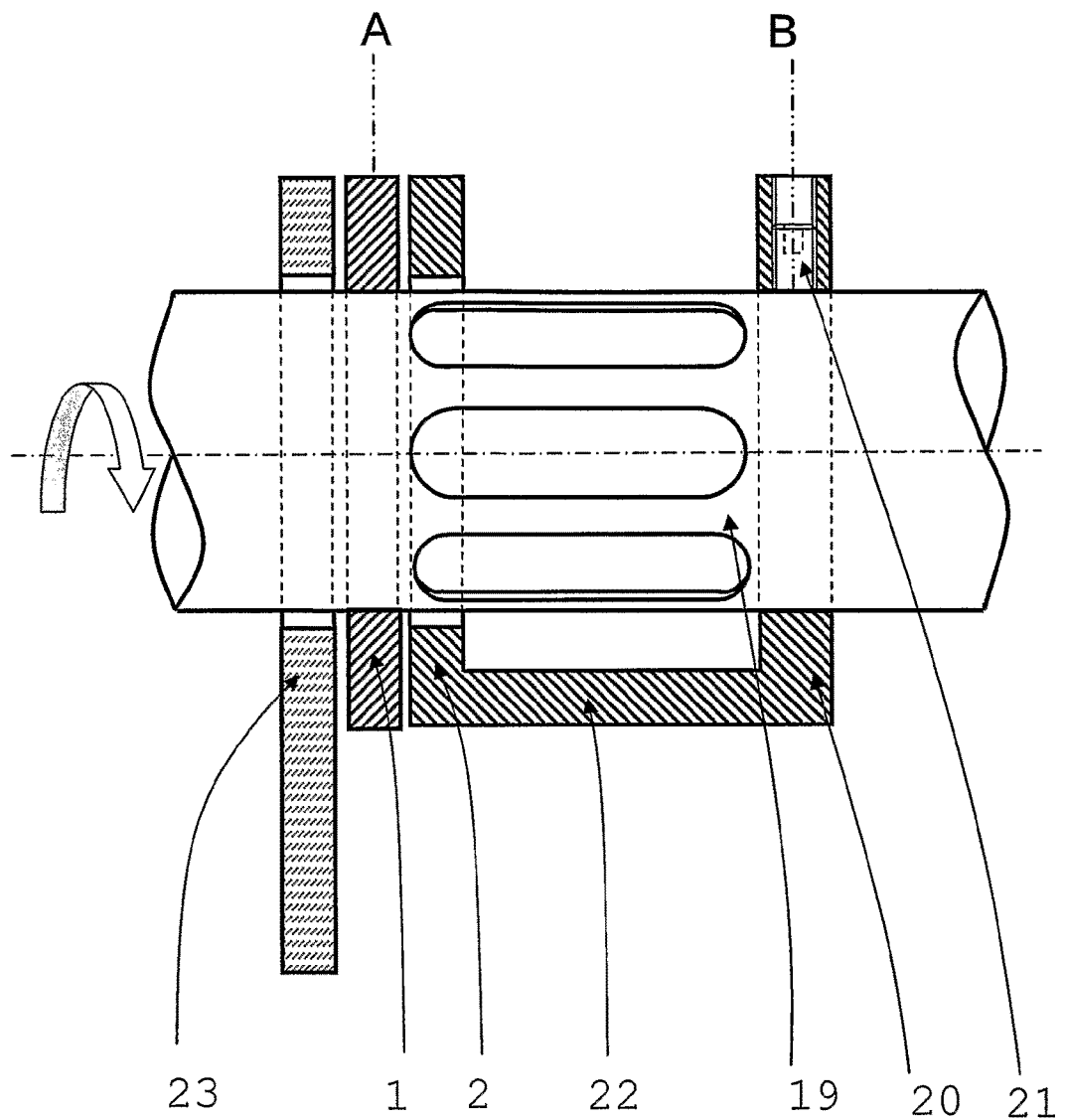
FIG. 13 shows an arrangement for measuring torque in a shaft which uses a transformer winding to energise and receive signals from the antenna.

FIG. 13 shows a sectional schematic of the detector's main elements co-operating with a rotating shaft [19] so that the degree of twist between points A and B may be measured. Advantageously such a measurement is an indirect method of measuring applied torque. An electrical intermediate device [2] is attached to point B on the shaft using a bar [22], collar [20] and a grub screw [21]. An antenna [1] comprising a planar arrangement of transmit and receive windings [1a, 1b & 1c] is attached to the shaft [19] at point A. As a torque is applied to the shaft [19] the angular position of the shaft's [19] circumference at point A shifts slightly relative to the angular position of the shaft's [19] circumference at point B. The magnitude and sense of the angular variation is directly proportional to magnitude and sense of the applied torque up to the shaft's [19] elastic limit. The magnitude of the angular variation may be increased by providing slots or grooves in the shaft [19] as shown in FIG. 13, in order to provide a sufficiently large angular variation that might be measured accurately. If the torque variation produces a maximum angular variation of +/−X degrees then preferably the antenna [1] and electrical intermediate device [2] are arranged in a multi-pitch construction of 360/2X pitches. The transmit windings [1c] are energised from an electrical supply via an annular transformer [23] whose central hole fits over the shaft [19]. The signals from the antenna's receive windings [1a & 1b] are transported using multiple windings of the same transformer [23] to an electronics circuit [18—not shown for clarity]. Preferably the axial distance between the transformer [23] and the antenna [1], as well as the distance between the electrical intermediate device [2] and the antenna [1] should be kept as small as possible to produce good levels of electrical coupling. Good electrical coupling produces good signal:noise ratios in the detector.

Figure 14:
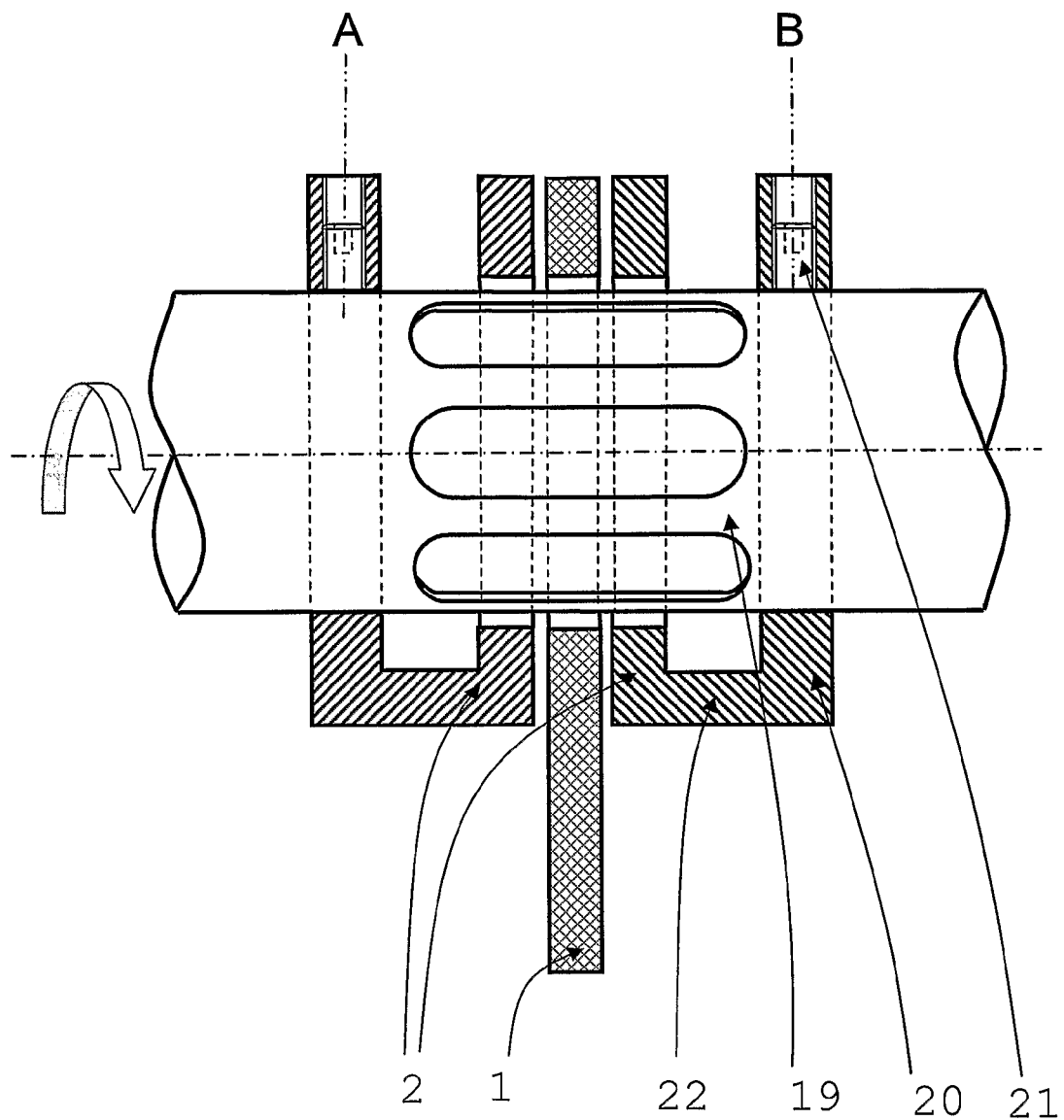
FIG. 14 shows an arrangement for measuring torque in a shaft.

FIG. 14 shows an alternative arrangement for the measurement of torque. Rather than a transformer [23] two electrical intermediate devices [2] are used on either side of the antenna [1]. The position of both may be measured as the shaft [19] rotates such that their relative shift is indicative of applied torque.

Figure 15:
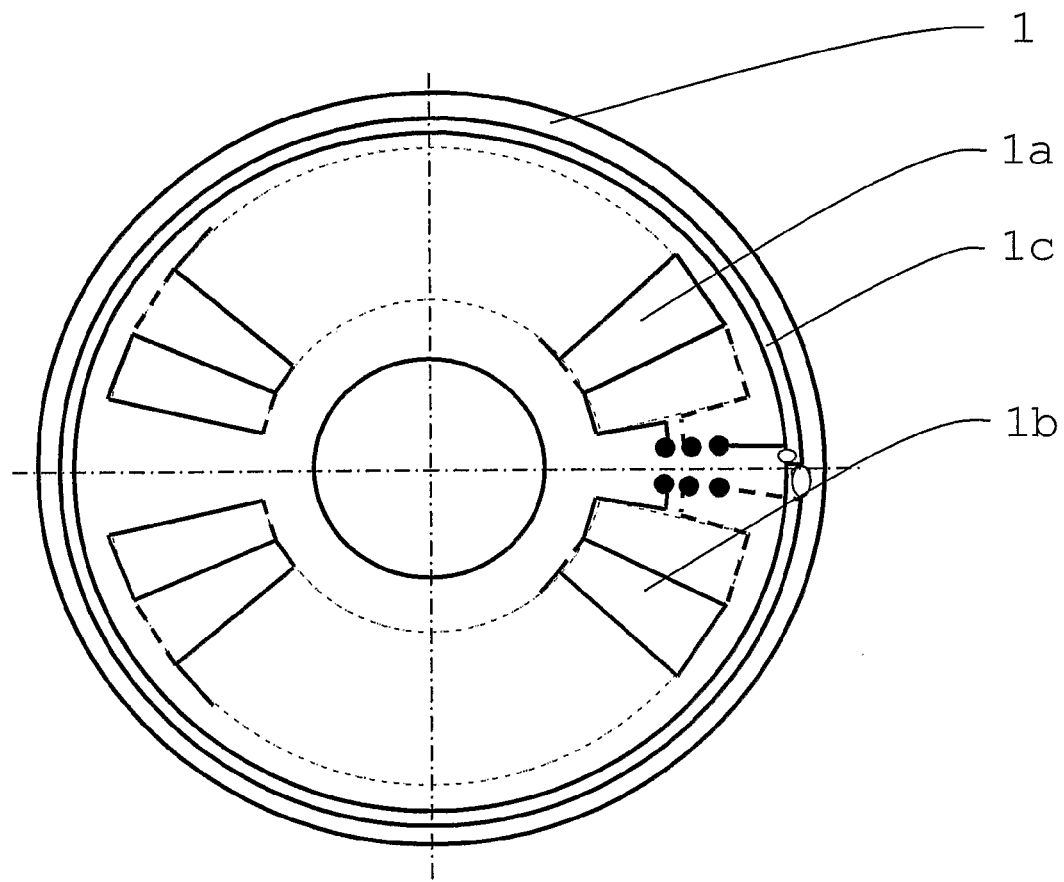
FIG. 15 shows an antenna winding arrangement suitable for rotary position measurement.

FIG. 15 shows an antenna [1] arrangement suitable for rotary measurements. In this arrangement the receive windings [1a & 1b] occupy only a segment or portion of the antenna rather than running a full 360 degrees. Such an arrangement is space efficient and is particularly advantageous for encoders in small motors. Further, the maximum stand off distance between target [2] and antenna is increased for a given antenna size.

The antenna's transmit and receive windings [1a, 1b & 1c] may be simplified when the invention is used in a pulse echo mode. In this mode the windings are first of all energised with an AC signal which is then switched off to allow the windings then to receive any signals coming back from a resonating electrical intermediate device. Only 2 windings with known separation are required.

There is no absolute size limitation to the invention. The limits are set by limits of manufacturing processes rather than physical laws. At one extreme, very large detectors can be produced by winding copper wire over pegs arranged at defined positions on a surface. At the other extreme, very small detectors can be produced using deposition of conductive tracks on a silicon wafer. This is particularly advantageous when the tracks are deposited on the same silicon as that used for the electronics circuit [18] in the form of an application specific integrated circuit. The use of conductive inks printed on to an insulating substrate such as polyester or polyamide are particularly useful technique to produce electrical intermediate devices [2] and antennae [1]. Advantageously, polyester and polyamide substrates may be produced in a flexible form which may also be printed with a contact adhesive for ease of attachment to a host system. In printed constructions electrical insulation at cross over points can be maintained by printing a first conductive track followed by an insulating layer at the area of the cross over and then another conductive track over the top of the insulating layer. Glass is a particularly good substrate in harsh environments due to its stability and low coefficient of thermal expansion. Further construction methods include double sided printed circuit board with or without plated through holes; ultrasonic bonding of insulated copper wire on to an insulated substrate and windings which are laser cut or stamped and then folded from sheet metal such as copper, aluminium or steel.

As has already been stated in the description of FIG. 1 the invention is not limited to the measurement of linear displacement. This will be obvious to those skilled in the art. If the arrangement of the electrical intermediate device [2] and antenna [1] is bent around an axis it can be seen that the invention is suitable for the measurement of rotary position. Further the electrical intermediate device and antenna can be arranged for a wide variety of sensing geometries including curvi-linear, 2-dimensional (by the use of multiple overlapping linear encoders), cylindrical, roll, pitch and yaw.

To a significant extent, variation in the position of the electrical intermediate device [2] relative to the antenna [1] in axes other than the main measurement axis does not affect the measured value. In particular, the stand off distance between electrical intermediate device [2] and antenna [1] in the z-axis can vary without altering the measured displacement. The range of acceptable variation can be extended by bracketing the amplification factors used in the electronics circuit [18] according to the amplitude of the received signals. If the electrical intermediate device [2] to antenna [1] distance is large then the amplitude of received signals will be small and large amplifications should be applied. The converse applies if electrical intermediate device [2] to antenna [1] distance is small. Since received amplitude is a coarse measure of z-axis separation then this can be used to call up different error correction factors stored within the electronics.

The invention is able to identify a multiplicity of electrical intermediate devices [2] and measure their displacement relative to an antenna [1] in a roughly concurrent fashion. This is accomplished by providing each electrical intermediate device [2] with its own resonant frequency. Individual resonant frequencies are most readily attained by careful selection of different capacitor [7] values for example to produce 3 electrical intermediate devices [2] with resonant frequencies of 1, 2 and 3 MHz. The electronics circuit [18] can be programmed to excite at these frequencies in turn and carry out measurements for each electrical intermediate device [2]. In order to maximise the frequency and accuracy of measurements more sophisticated excitation and measurement algorithms can be used where, for example, the electrical intermediate device [2] which is found to be generally stationary is measured least and the one that has moved most recently or most often is measured most frequently.

Other frequencies not corresponding to resonant frequencies can be used to measure, and hence cancel out, background received levels.

In order to maximise received signal strength and hence maximise the signal:noise ratio the electronics circuit [18] should include a frequency tuning circuit so that the exact resonant frequency of the electrical intermediate device [2] or devices may be used as the transmit frequency. In this way a maximum amount of transmitted energy goes in to producing electrical resonance of the electrical intermediate device [2] so that it, in turn, produces maximum electromagnetic signal.

It will be appreciated by those skilled in the art that the invention is not restricted by a particular number or arrangement of windings and that various permutations of number, spacing and arrangement are feasible.

Multiple resonant circuits and multiple antennae may be constructed on the same physical unit of printed circuit board by simply avoiding electrical connection between the various systems. Multiple layer PCB is particularly useful in this regard. Such constructions are particularly advantageous in detectors for safety related environments where electrical redundancy is necessary. In an electrically redundant system a multiplicity of circuits of varying frequencies may be concurrently detected using a multiplicity of antennae energised with the relevant frequencies, each antenna [1] being controlled by its own electronic circuit [18].

In some safety related applications or applications where high levels of availability and reliability are required then detectors may be constructed with self checking hardware and software. Not only can the electronic circuit's [18] software contain the traditional techniques associated with checking for open circuits, out of bounds measurements etc. but an electrical intermediate device [2] may be fixed relative to the antenna [1]. In this way a self diagnostic check may be carried out by measuring the position of the fixed electrical intermediate device. If the fixed device appears to have moved from its known position, past predefined limits, then this may be taken as a fault and an alarm or corrective action taken accordingly.

The invention's electromagnetic emissions can be reduced by balancing each loop of the transmit winding [1c] with a counter wound loop away from the electrical intermediate device [2]. The electromagnetic immunity of the electrical intermediate device [2] can be increased in a similar way by using opposing loops away from the transmit winding [1c]. The invention otherwise has a naturally high electromagnetic immunity due to the counter wound receive loops [1a & 1b] which are balanced to far field.

Preferably any material present between the electrical intermediate device [2] and antenna [1] is an insulator such as plastic, ceramic or wood. A metal barrier can be placed between the electrical intermediate device [2] and antenna [1] so long as the excitation or resonant frequency is sufficiently low to permit the signals to carry through the metal's skin depth. If a metal barrier is essential then preferably the metal has a relatively low magnetic permeability such as non-magnetic stainless steel (e.g. 316 grade stainless). A frequency of 40 kHz is, for example, sufficient to permit the transmission of signals through 2 mm thick, non-magnetic 316 grade stainless steel sheet.

The invention is limited in the maximum stand off distance between electrical intermediate device [2] and antenna [1] compared to other inductive techniques. This can be used advantageously in the construction of the antenna [1] and electronics circuit [18] on a multilayer printed circuit board. The antenna [1] may be arranged on the first pair of relatively thin layers and the electronics circuit [18] placed on one or more thin layers separated from the first two by a thicker layer. The dimension of the thick layer is at least as large as the maximum dimension of the antenna's [1] sensing range. This enables the electronics circuit [18] to be sufficiently out of range so as not to interfere with the antenna's [1] electromagnetic field but allows a compact arrangement and minimum use of circuit board.

For most applications the effect of extreme or changing temperatures will have negligible effect on measurement performance. In some applications, however, very high accuracy measurement is required even though the operating temperature range or variation rate may be extreme. In such instances, the relatively small expansion or contraction of the antenna [1] or target [2] may lead to erroneous measurement. Such temperature effects may be counteracted by measuring the actual operating temperature and modifying the measured position accordingly, i.e. reducing or increasing the measured value according to the temperature. Temperature can be measured using a thermocouple or resistance device but preferably the resistance of one or more of the antenna windings [1a, 1b or 1c] can be used to provide an indication of temperature. Measurement of the winding resistance is preferable to measurement by a thermocouple because the windings provide a more representative measurement due to their position along the measurement axis (rather than being constrained to a single point as with a thermocouple).

There are many applications for the invention including, but not limited to: actuators, aileron controls, angle sensors, radar antenna tracking, anti-counterfeit devices, audio controls, automatic guided vehicles, automatic teller machines, automation equipment, ball screws, boilers, brake sensors, brake wear sensors, burners, climate controls, cockpit controls, component identification, consumer electronics, cookers, cooking ranges, cooktops, dials, direction indicators, dishwashers, displacement sensors, door travel sensors, elevators, end of shaft encoders, fitness equipment, flow sensors, food mixers, fuel level sensors, fuel metering, games, gauges, giant magnetoresistive sensor replacements, guided vehicle tracking, gunnery sights, Hall affect replacements, headlamp level controls, HVAC sensors, hydraulic actuators, hydraulic valves, identification tags, impellers, inclinometers, indexing tables, indicator gauges, Inductosyn replacements, industrial control panels, joysticks, kitchen goods, lifts, lighting controls, limit switch replacements, linear actuators, liquid level sensors, load sensors, LVDT replacements, machine tools, magnetostrictive sensor replacements, marine engines, marine equipment, mining equipment, missile guidance, motion controllers, motor encoders, odometers, packaging equipment, palletisers, paper thickness sensors, pedal sensors, pen sensing, petrochemical sensors, plotter controls, pneumatic actuators, pneumatic valves, pressure sensors, printer write heads, PRNDL sensors, proximity sensors, push buttons, radar controls, ride height sensors, robots, roll/pitch/yaw sensors, roller separation sensors, rotary encoders, RVDT replacements, safety switches, seating instrumentation, security tags, servo motors, shaft encoders, sheet feeders, skis, sliders, speed sensors, sports equipment, steering angle sensor, steering column controls, stepper motors, strain measurement, suspension dampers, suspension sensors, tachometers, tamper evident devices, throttle controls, tilt sensors, torque sensors, toys, traction control, transmission sensors, turbines, user interface elements, utility meters, valves, velocity sensors, vibration sensors, washing machines, weight sensors, wheel sensors, workpiece identification.

What is claimed is:

1. An inductive position detector comprising an oscillator for providing an alternating current signal, a first inductive device and a second inductive device which defines a measurement path, the measurement path having a length and a width, the second inductive device comprising at least two receive windings and a transmit winding, wherein:

the first inductive device comprises a passive resonant circuit formed by an inductive winding connected in series with a capacitor, said inductive winding being disposed on a substrate so that the passive resonant circuit is substantially laminar being formed on a plane defined by the substrate, wherein said inductive winding comprises a conductor, a first part of said conductor extends away from the capacitor on one side of said lamina, in said plane defined by the substrate, on a serpentine pattern which periodically repeats multiple times along the substrate and extends along said length of said measurement path in a first direction and includes, in each period thereof, a succession of only three sides of a rectangle, and a second part of said conductor extends on the same side of the substrate as said first part, in said plane defined by the lamina, in a direction opposite to said first direction alongside said first part, the second part of said conductor being spaced apart from, so as not to intersect, said three sides of the rectangle and thereby define consecutive regions on the same side of the lamina as said first part, on said plane defined by the substrate, said consecutive regions being spaced apart from each other along said length of said measurement path around which current flows in one and the same direction;

said at least two receive windings of the second inductive device are each formed by at least a respective outward conductive winding in series with a respective return conductive winding;

the outward winding and the return winding of each of said receive windings of the second inductive device cross at least three times to form at least four inductive loops, and each outward winding in a direction transverse to the measurement path varies periodically along the measurement path; and the transmit winding of the second inductive device is electrically connected to the oscillator for energizing the transmit winding with the alternating current signal, the transmit winding configured to induce an alternating current in the passive resonant circuit, such that the induced alternating current in the passive resonant circuit induces an alternating signal in each receive winding by virtue of mutual inductance between the receive windings and the passive resonant circuit.

2. The inductive position detector as claimed in claim 1, wherein the return winding of each receive winding in a direction transverse to the measurement path varies periodically along the measurement path.

3. The inductive position detector as claimed in claim 1, wherein said consecutive regions define areas which are equal.

4. The inductive position detector as claimed in claim 1, comprising further inductive devices, each comprising a respective resonant circuit, with each resonant circuit having a different resonant frequency.

5. The inductive position detector as claimed in claim 1, wherein the transmit winding has a constant width along the measurement path.

6. The inductive position detector as claimed in claim 1, wherein said outward windings have a periodic variation with a shape selected from the group consisting of rectangular, sinusoidal, and triangular.

7. The inductive position detector as claimed in claim 1, wherein said conductor of the first inductive device has a period in the direction transverse to the measurement path which is the same as that of the outward winding of each receive winding.

8. The inductive position detector as claimed in claim 1, wherein each outward conductive winding has the same periodic variation and two of said at least two receive windings of the second inductive device are displaced relative to one another by a fixed distance equal to an integer multiple of one quarter of said periodic variation.

9. The inductive position detector as claimed in claim 1, wherein the windings of the second inductive device are provided as conductive tracks on a printed circuit board.

10. The inductive position detector as claimed in claim 1, wherein the windings of the second inductive device are provided on a laminar substrate having two opposed faces and for each receive winding: the outward conductive winding is provided on a first face of the two opposing faces and the return conductive winding is provided on a second face of the two opposing faces which is opposite to said first face.

11. The inductive position detector as claimed in claim 1, wherein the measurement path is linear.

12. The inductive position detector as claimed in claim 1, wherein the measurement path is curved.

13. The inductive position detector as claimed in claim 1, wherein said second part returns to said capacitor in a straight line.

14. An inductive position detector comprising an oscillator for providing an alternating current signal, a first inductive device and a second inductive device which defines a measurement path, the measurement path having a length and a width, the second inductive device comprising at least two receive windings and a transmit winding, wherein:

the first inductive device comprises a passive resonant circuit formed by an inductive winding connected in series with a capacitor, said inductive winding being disposed on a substrate so that the passive resonant circuit is laminar being formed on a plane defined by the substrate, wherein said inductive winding comprises a conductor, a first part of said conductor extends away from the capacitor on one side of said substrate, on said plane defined by the substrate, in a serpentine pattern which periodically repeats multiple times along the substrate and extends along said length of said measurement path in a first direction and includes, in each period thereof, a succession of only two sides of a triangle, and a second part of said conductor extends on the same side of the substrate as said first part, on said plane defined by the substrate, in a direction opposite to said first direction alongside said first part, the second part of said conductor being spaced apart from, so as not to intersect, the two sides of the triangles and thereby define consecutive regions on the same side of the substrate as said first part, on said plane defined by the substrate, said consecutive regions being spaced apart from each other along said length of said measurement path around which current flows in one and the same direction;

said at least two receive windings of the second inductive device are each formed by at least a respective outward conductive winding in series with a respective return conductive winding;

the outward winding and the return winding of each of said receive windings of the second inductive device cross at least three times to form at least four inductive loops, and each outward winding in a direction transverse to the measurement path varies periodically along the measurement path; and the transmit winding of the second inductive device is electrically connected to the oscillator for energizing the transmit winding with the alternating current signal, the transmit winding configured to induce an alternating current in the passive resonant circuit, such that the induced alternating current in the passive resonant circuit induces an alternating signal in each receive winding by virtue of mutual inductance between the receive windings and the passive resonant circuit.

* * * * *